INVENTORS
Walter Stöger
Helmuth Hennetmayr
Wolfgang Pesta

BY Stephens, Huettig and O'Connell
ATTORNEYS

Jan. 13, 1970 W. STOGER ET AL 3,488,910
HEAT SEALING PLASTIC BAGS

Filed Dec. 22, 1967 2 Sheets-Sheet 2

INVENTORS
Walter Stöger
Helmuth Hennetmayr
Wolfgang Pesta
BY Stephens, Huettig and O'Connell
ATTORNEYS

United States Patent Office 3,488,910
Patented Jan. 13, 1970

1

3,488,910
HEAT SEALING PLASTIC BAGS
Walter Stoger, Helmut Hennetmayr, and Wolfgang Pesta, Linz (Danube), Austria, assignors to Osterreichische Stickstoffwerke AG, Linz, Austria
Filed Dec. 22, 1967, Ser. No. 693,016
Claims priority, application Austria, Jan. 4, 1967, A 69/67
Int. Cl. B65b 51/06, 51/10, 55/24
U.S. Cl. 53—14                    11 Claims

ABSTRACT OF THE DISCLOSURE

The corners on one edge of a thermoplastic plastic bag are beveled and the edges between the corners separated by suction nozzles. At the same time, an air jet blows away any dirt or dust on the separated edges. A thermoplastic strip is then inserted between the cleaned edges, and finally the edges are heat sealed to the strip.

---

This invention relates to an improved method for heat sealing thermoplastic films made into tubes. This method has especial advantages for closing bags filled with very dusty goods. This invention includes the apparatus for performing the method.

When bags containing very dusty goods are heat sealed, the difficulty often occurs that the welded seam is weak because of the dust clinging to the surfaces which are being joined. The strength of the seam is about 40% less than that of a clean seam. When using synthetic plastics, such as polyolefins, the seam becomes more brittle because of the heat treatment than the unheated areas so that the weakening of the seam presents a serious problem. When polypropylene is used, this synthetic plastic often contains softening additives for reducing the brittleness, which additives, when the heat welding is taking place, diffuse from the compound and produce a weakened seam, if the heat sealing is not entirely prevented.

Attempts to remove the dust from the edge surfaces being sealed have been only partially successful because the electrostatic charge on the dust causes it to cling very tightly to the surface. When suction is used to remove the dust, a strong enough suction will only stir up the dusty goods in the bag with the result that the sealing surfaces become dusty over again.

It has been proposed to seal the seam by means of a so-called rider band seam. This is not fully successful because the inner heat welded seam is so weak as to break open and the rider band carries the entire load.

In this invention, it has been found that thermoplastic bags filled with very dusty goods can be satisfactorily closed by a welded seam of sufficient strength when the dust is first removed from the surfaces by means of compressed air and a vacuum, during which process the seam portion of the bag is closed off from the rest of the bag and then by using a thermoplastic strip inserted between the edge portions of the bag following which the edge portions are welded to the strip. Because, in this case, one dusty surface is always welded to a clean surface, the seam is correspondingly more solid and has extra strength because of the presence of the inserted strip. This method can be used for sealing materials made of polypropylene compounds in which the diffusion of the additives hinders the formation of a welded seam. In such cases, it is preferred that the strip is polypropylene without the additives which would diffuse. By using the same process, the bottom of the bags can be closed by a sufficiently strong welded seam.

An object of this invention is a method of heat sealing tubular plastic film, and especially for closing bags filled with very dusty goods. In this invention, the plastic sheet cut to a suitable length, or an already filled bag, has both corners diagonally cut away along the edges to be sealed, with the cuts being shallow with regard to the overall length of the bag. The edges between the cut corners are pulled apart by a vacuum applied to each edge and a compressed air jet is directed between the separated edges. A strip of the same material as the bags and not containing the additives is then inserted between the separated edges and after which the edges are heat sealed to the plastic strip.

When the strip is as wide as the extent of the cut corners, then the welded seam is tight and the bag completely closed. However, in many cases, it is desired that the bag has breathing points which are usually provided by perforating the bag. In this invention, such perforations are not necessary if the sealing strip has a length less than the depth of the cut corners, and preferably only about three-fourths of the corner depth as measured from the free edge of the bag. When the seam is formed, the remaining fourth is unsealed and thus provides an opening for airing the contents of the bag.

The bag which is to be heat sealed according to this invention can be composed of any synthetic thermoplastic material which can be heat sealed. Among such materials are especially olefin polymers or olefin copolymers or mixtures of these materials, as well as the polypropylenes heretofore mentioned, and including polyethylenes. Polyester resins can also be used.

With this invention, plastic bags of any given size and of any desired wall thickness can be heat sealed and/or closed. This makes it possible to make a heavy bottom seam on a bag that is to be filled with heavy goods.

The means by which the objects of the invention are obtained are described more fully with reference to the accompanying schematic drawings in which.

Figure 1:
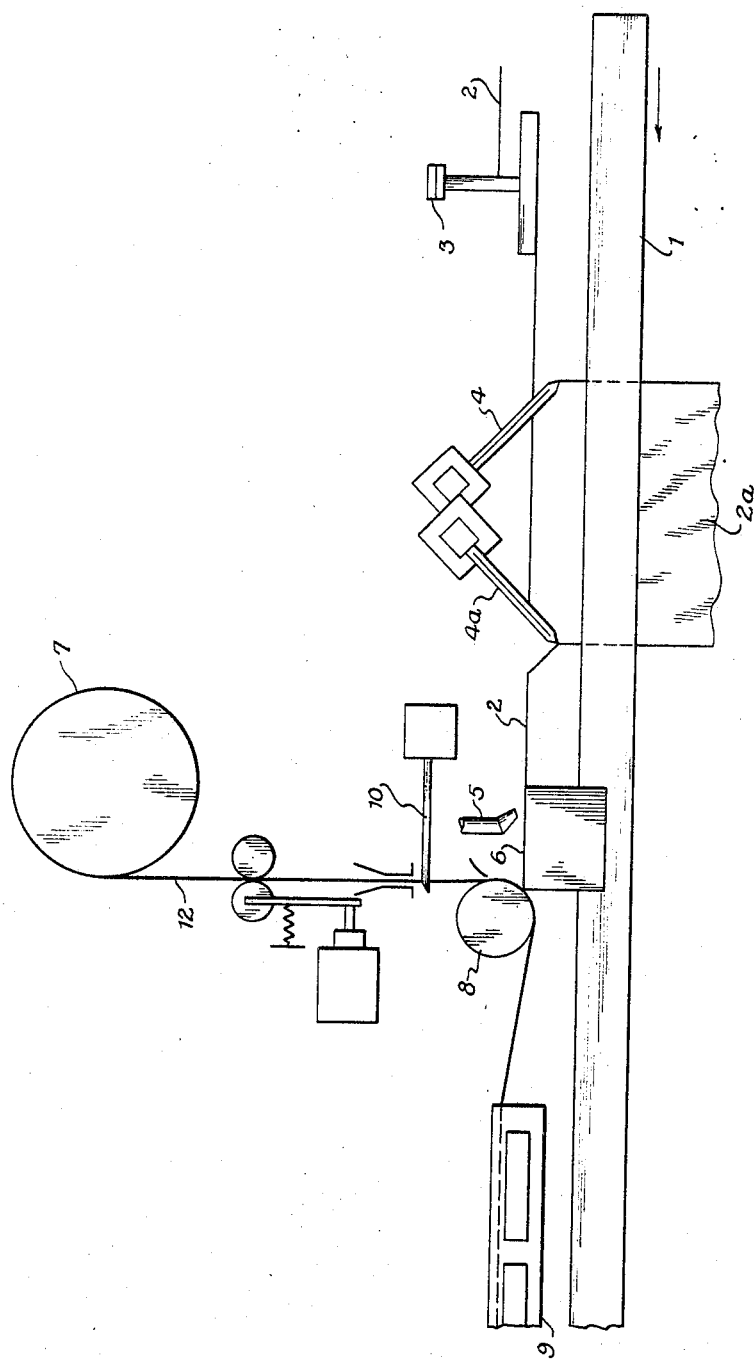
FIGURE 1 is a front elevational view of the apparatus for producing the heat seal.

As shown in FIGURE 1, a pair of conveyor belts 1 moving in the direction of the arrow transports the bag with the upper edge 2 of the bag being closed off from the body of the bag by being pinched by the conveyor belts. The edge 2 of the bag to be closed is cut by the knife 3. The corners of edge 2 are cut off by the knives 4 and 4a. They are symmetrically aligned and the forward knife 4a forms an obtuse angle with the conveyor belts. A vacuum means 6 follows the knives for pulling the edges of the bag apart and for removing the dust from the separated edges. A compressed air nozzle 5 injects air between the separated edges and assists both in the removal of the dust and the separation of the edges. A feed roll 7 supplies the strip which is to be inserted between the edges. The strip 12 is pulled off the roll 7 by a guide roller 8 and is cut to a suitable length by knife 10. Following this, the bag passes to the heating means 9 which is composed of several heating irons and followed by cooling blocks. The drive for the inserted strip as well as for knives 4 and 4a is controlled, for example, electrically or magnetically so that the corners of the bag are cut and the strip inserted with proper timing.

Figure 2:
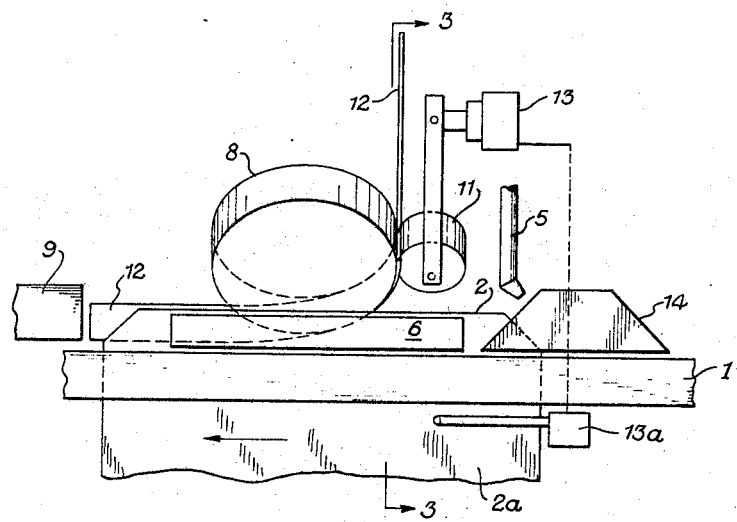
FIGURE 2 is a partial similar view, partially shown in perspective, of a part of a portion of FIGURE 1.
Figure 3:
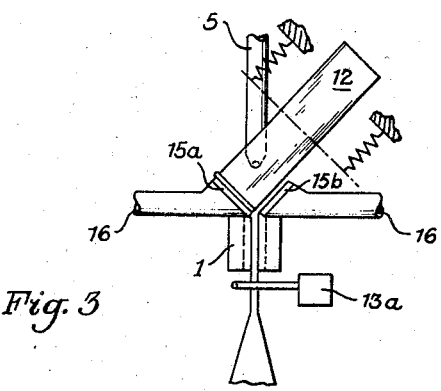
FIGURE 3 is a cross-sectional view taken on the line 3—3 of FIGURE 2.

FIGURES 2 and 3 further illustrate the insertion of the strip 12. The edge of the bag 2 with the already cut corners is shown in the zone containing the air nozzle 5, the vacuum means 6, the guide roller 8 and the heat sealing means 9. A conventional means is indicated for starting the strip inserting mechanism. This is composed of a solenoid 13 actuated by a sensor 13a to drive a guide roller 11 so that the strip is pulled from the feed roll 7 and inserted between the separated edges of the vertical ag. This movement is then stopped by sensor 13a. Sheet metal guide plates 14 assist in moving the bag.

The vacuum means is in two parts mounted on the opposite sides of the bag. It can be composed of nozzles having elongated orifices or rows of round nozzles. The suction nozzles 15a and 15b are indicated as having elongated orifices. These nozzles are each connected to the suction pipes 16.

The heating means for sealing the plastic bag can be of any suitable type.

Having now described the means by which the objects of the invention are obtained.

We claim:

1. A method of heat sealing a tube composed of a thermoplastic film cut to a suitable length comprising diagonally cutting the corners of said tube on the tube end at which the edges are to be sealed, applying a vacuum to said tube to separate said edges while simultaneously injecting compresed air between said edges, inserting a strip of plastic film between said edges, said strip being composed of the same material as said tube but without containing any additives except for stabilizers, and then heat sealing said edges to said strip to form a welded seam.

2. A method as in claim 1, said welded seam extending to only a part of the edge portion of said tube as defined by the diagonnally cut corners.

3. A method as in claim 2, said part comprising about three-fourths of said edge portion.

4. A method of claim 1, said thermoplastic film comprising a material in the class consisting of olefin polymers and olefin copolymers.

5. A method as in claim 1, said thermoplastic film consisting of a thermoplastic mixture mainly composed of polypropylene.

6. A method as in claim 1 wherein said tube is a bag filled with very dusty goods, and said injected compressed air blows the dust away from said edges.

7. A method as in claim 6, said thermoplastic film being composed of a material selected from the class consisting of polypropylenes and polyethylenes.

8. An apparatus for heat sealing a thermoplastic tube comprising a pair of conveyor belts for carrying a tube therebetween and at a right angle thereto, a pair of knives adjacent said belts for cutting off the corners at an obtuse angle on one end of said tube, air nozzle means mounted adjacent said belt for injecting compresed air between the corner cut edges of said tube, vacuum means adjacent said air nozzle means for pulling apart said edges, feed roller means positioned adjacent said vacuum means for feeding a plastic strip between the pulled apart edges, guide roller means for pushing said strip against said feed roller means and for moving said strip, and heating means for sealing said strip between said edges.

9. An apparatus as in claim 8, said vacuum means comprising a pair of vacuum nozzles acting on opposite sides of said tube.

10. An apparatus as in claim 8, said vacuum means comprising elongated suction nozzles.

11. An apparatus as in claim 8, further comprising sensor means for detecting movement of said tube by said belts, and solenoid means coupled to said sensor means for actuating said guide means.

References Cited

UNITED STATES PATENTS 3,432,982   3/1969   Brinkmeier et al. _____ 53—167 X

FOREIGN PATENTS 732,037   4/1966   Canada.

THERON E. CONDON, Primary Examiner

N. ABRAMS, Assistant Examiner

U.S. Cl. X.R.

53—39, 70, 137, 167